(12) United States Patent
Guerra et al.

(10) Patent No.: US 7,883,649 B2
(45) Date of Patent: Feb. 8, 2011

(54) FLYING FOAM APPARATUS AND METHOD OF MAKING FLYING FOAM

(76) Inventors: Francisco Guerra, 11054 County Road 71, Lexington, AL (US) 35648; Brian Glover, 11054 County Road 71, Lexington, AL (US) 35648

( * ) Notice: Subject to any disclaimer, the term of this patent is extended or adjusted under 35 U.S.C. 154(b) by 371 days.

(21) Appl. No.: 12/026,006

(22) Filed: Feb. 5, 2008

(65) Prior Publication Data

US 2009/0198574 A1    Aug. 6, 2009

(51) Int. Cl.
*G06Q 30/00* (2006.01)
(52) U.S. Cl. ............... 264/50; 425/4 C; 425/289; 264/148
(58) Field of Classification Search ............ 264/50, 264/148; 425/4 C, 289
See application file for complete search history.

(56) References Cited

U.S. PATENT DOCUMENTS

| | | | | |
|---|---|---|---|---|
| 3,972,666 A | * | 8/1976 | Pandur | 425/208 |
| 4,075,265 A | * | 2/1978 | McClung et al. | 264/53 |
| 6,276,459 B1 | * | 8/2001 | Herrick et al. | 169/14 |
| 2005/0257317 A1 | * | 11/2005 | Guerra | 4/559 |
| 2006/0030632 A1 | * | 2/2006 | Krueger et al. | 521/50 |
| 2006/0034960 A1 | * | 2/2006 | Pucci et al. | 425/110 |

FOREIGN PATENT DOCUMENTS

JP    H10-244532    *    9/1998

* cited by examiner

*Primary Examiner*—Joseph S Del Sole
*Assistant Examiner*—Kimberly A Stewart
(74) *Attorney, Agent, or Firm*—David W. Barman; Robert M. Schwartz

(57) ABSTRACT

The present invention is an apparatus for generating foam shapes that float in air having a container, a gas source, an aeration nozzle for aerating a gas from the gas source, an outlet, and a separator for separating extruded foam into individualized foam shapes.

25 Claims, 8 Drawing Sheets

FLYING FOAM APPARATUS AND METHOD OF MAKING FLYING FOAM

BRIEF SUMMARY OF THE INVENTION

The present invention relates to an apparatus for producing floating foam shapes and a method of advertising using floating foam shapes.

In order for foam to achieve flight, the overall mass of a given volume of foam must be less than the air it is displacing (Archimedes principle). It is desirable to have foam with a large bubble size. Large bubble size foam has water to surfactant percentage of 86% or less, and an expansion ratio of more than 200. Larger sized bubbles within the foam hold more gas, and hence have more lift. Tightly packed foam, also called low expansion foam, has small sized bubbles.

One example of low expansion foam is shaving cream. Low expansion foam is undesirable for incorporation into flying foam. Low expansion foam does not entrap sufficient gas in order to produce the desired lifting effect.

The gas used to create lighter than air foam must be one having particular properties desired to create the lifting effect. Ideally, the gas should have a molecular mass of less than about 28.97. Molecular mass is the mass of one molecule of that substance, relative to the unified atomic mass unit u (equal to $1/12$ the mass of one atom of carbon-12). Many chemists use molecular mass as a synonym of molar mass, differing only in units. As used herein, they are considered synonymous. For example, Hydrogen has a molecular mass of approximately 1, or 1 atomic mass unit (amu), acetylene has a molecular mass of about 26.0373.

There are numerous compounds and elements that satisfy the desired molecular mass requirement. Some examples of suitable gases include, but are not limited to, helium, hydrogen, methane, ammonium, neon, acetylene, hydrogen cyanide, ethylene, carbon monoxide, hydrogen fluoride, diborane, nitrogen, heated ambient air, and mixtures thereof. Additionally the gas may be compressed ambient air mixed with a lighter than air gas. This list is not intended to be complete but only illustrative of some suitable gases.

Additionally, heated ambient air may be used to accomplish the desired lifting effect. Charles' Law states that the density of a gas can be reduced by raising its temperature while leaving its intrinsic pressure unchanged. For example, hot air balloons use heated air to create great lift in achieving flight. The altitude of hot air flying foam can be regulated by controlling the relative temperature of the extruded foam.

In a preferred embodiment, a lighter than air gas is introduced into a reservoir containing a foam forming solution. Preferably the foam forming solution is a water-based solution having a least one surfactant.

The present invention provides for an apparatus to create foam shapes that float. A container having a foam solution has a gas line for introduction of gas to the interior of the solution container. The gas line has a first end and a second end. The first end of the gas line is on the exterior of the foam solution container and is connected to a source of gas. Gas travels from a source through the gas line into the foam solution container and exits the second end of the gas line into an aeration assembly. The gas entering the chamber is preferably regulated to less than about 60 pounds per square inch (psi) using gas cylinder regulators as are commonly known. The second end of the gas inlet has an aeration nozzle. In a preferred embodiment, the aeration nozzle has openings ranging in size from about 0.062 to about 0.125 inches in diameter. The aeration nozzle disperses the gas throughout the foam solution.

As gas is introduced into the solution chamber, foam is created on the upper surface of the solution. As foam is continually created, the difference in air pressure inside the solution container relative to the pressure outside the solution container, urges the foam upward towards the opening in a cap or logo board. The foam is extruded through a stencil shaped opening incorporated into the surface of the solution chamber cap that is a logo board. Included on the solution chamber assembly is a foam shape separator. In one embodiment, the separator is a cutting blade. The cutting blade is a mechanism that separates an individualized foam shape from the extrudate, or extruded foam shape, and does not necessarily require any degree of sharpness. Once the cutting blade has separated an extruded shape, the separated foam shape floats from the top of the chamber into the air.

Foam produced from common surfactants is typically white in color. The present invention further contemplates adding a color to the foam solution. Any acceptable color may be added. One type of acceptable dye is commonly used in food, drug, and cosmetic dyes. These dyes include but would not be limited to FD&C (Food Drug and Cosmetic) Blue No. 1 (Brilliant Blue), FD&C Blue No. 2 (Dark Blue), FD&C Green No. 3 (Blue-Green shade), FD&C Red No. 40, FD&C Red No. 3 (Pink shade), FD&C Yellow No. 5, FD&C Yellow No. 6 (Orange shade). The colors may include combinations of colorants.

The present invention also includes the ability to produce a flammable foam shape. Flammable foam would be accomplished by utilizing a flammable gas as the lighter than air gas. The flammable gases may include but would not be limited to methane, acetylene, ethylene, and hydrogen. The flammable foam may then be ignited by any ignition source as is commonly known. The pyrotechnic and fireworks industry utilize wireless ignition, and chemical ignition techniques that include but would not be limited to nichrome wire and potassium chlorate. Flammable foam may produce a prominent visual effect at night where the flammable foam is set against a dark night sky.

The present invention also includes the ability to produce a foam shape that is sensitive to ultraviolet or black light.

Foam that illuminates when exposed to black lights may be achieved by adding a blacklight sensitive compound to either or both of the inlet gas or foam solution. Such compounds may include but would not be limited to Quinine, Vitamin B-12, and Stilbene.

The present invention also includes the ability to produce foam that glows in the dark. A bioluminescence and/or chemiluminescent compound may be added to either or both of the inlet gas or foam solution. Some luminescent compounds may include but would not be limited to Luminol (5-Amino-2,3-dihydro-1,4-phthalazinedione), Cyalume (Diphenylefhandioate), Ruthenium(II) tris(bipyridine) dichloride, Oxalyl chloride and Pyrogallol. Additionally Luciferases, which emit bioluminescent properties, are routinely isolated from fireflies, aquatic sea creatures, and bacteria, may be used.

Also included in the present invention is a method for using flying foam to create a well-known corporate logo as a means for advertising. There are many shapes that have become well-known as being identified with particular companies and products.

The present invention also includes using multiple foam generating containers that may produce any or a combination of a plurality of shapes at one time, a plurality of shapes in succession, or a plurality of shapes that may be attached as they become airborne.

DETAILED DESCRIPTION OF THE PREFERRED EMBODIMENTS

Figure 1:
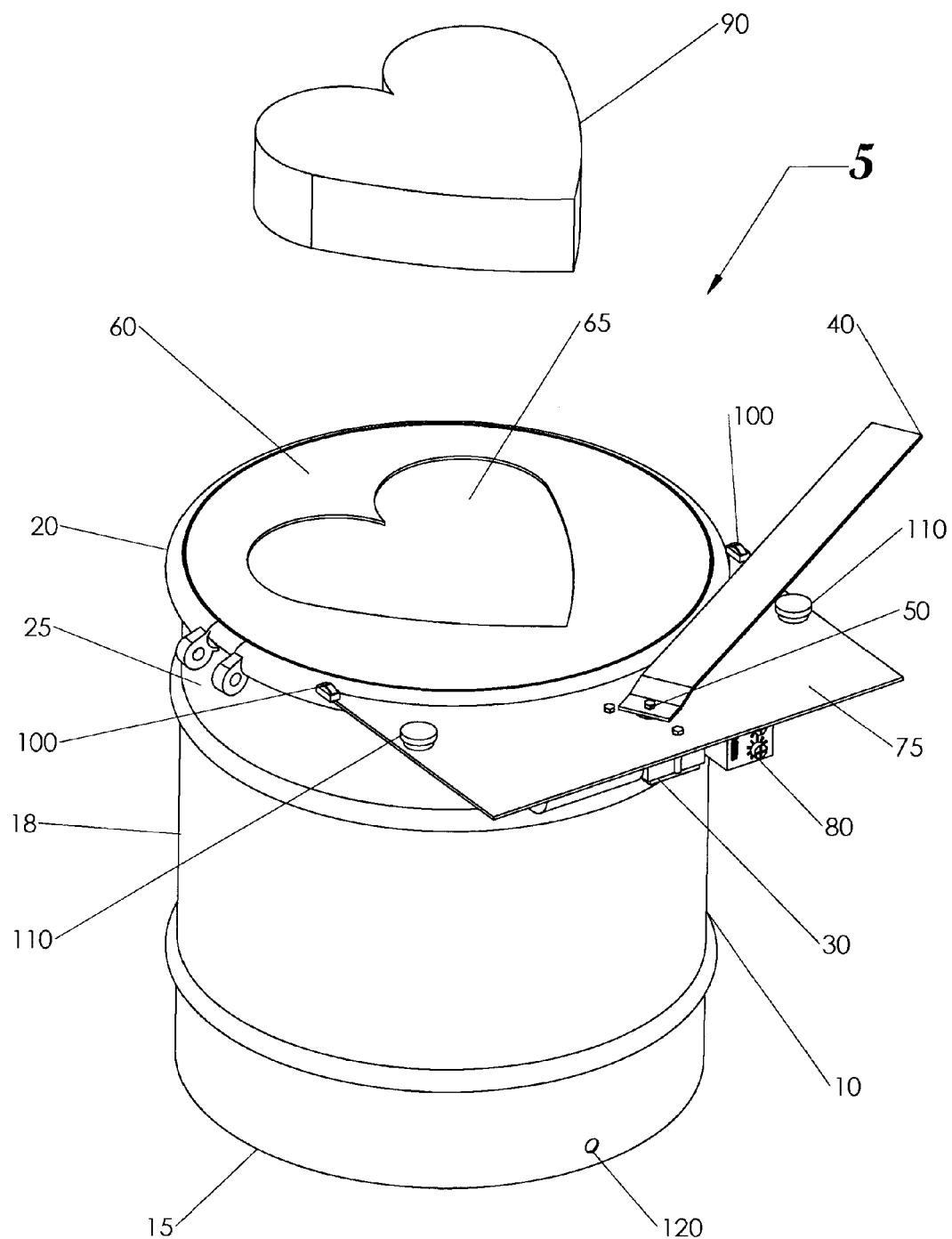
FIG. 1 is a side perspective view of the assembly of the present invention.
Figure 2:
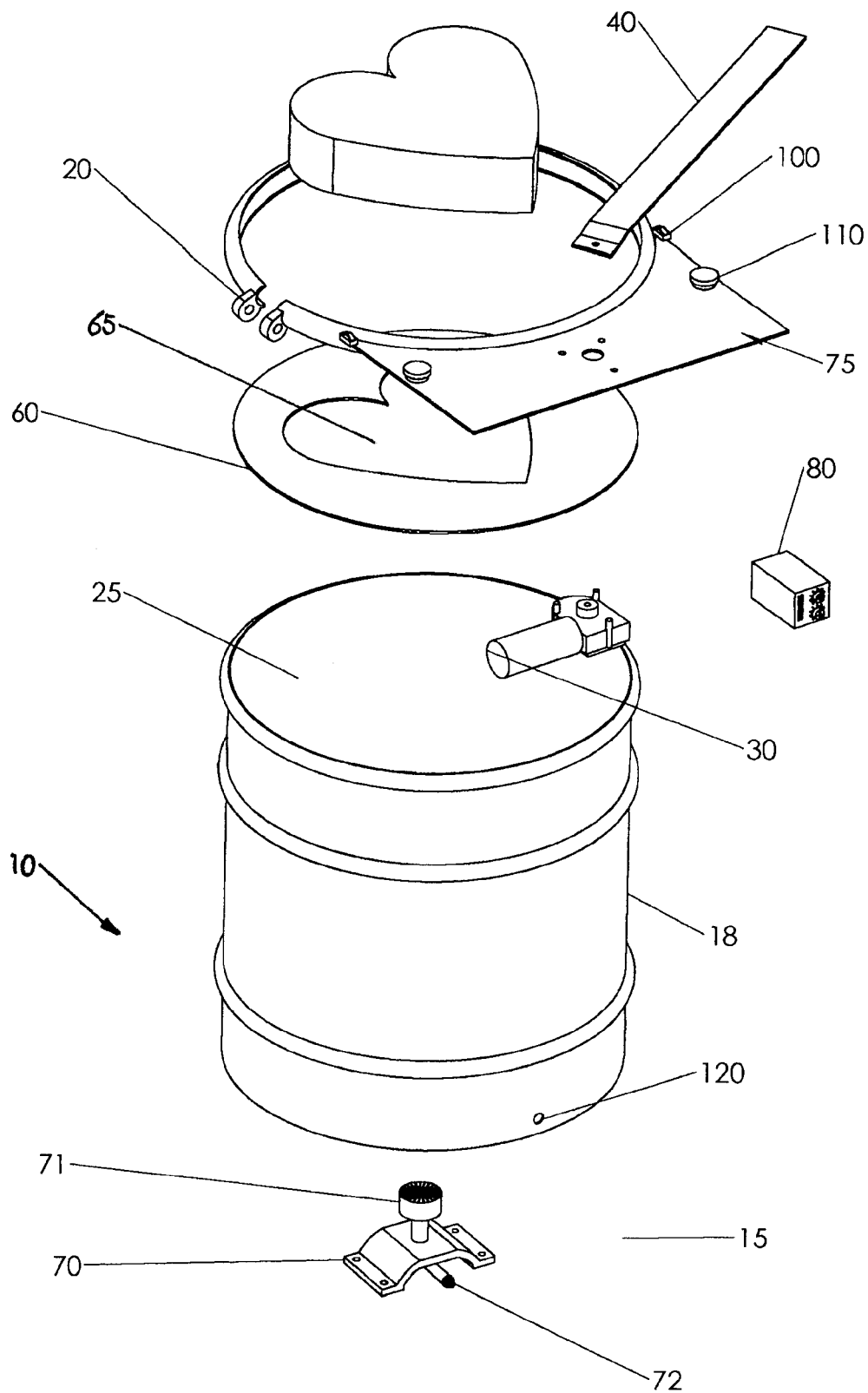
FIG. 2 is an exploded view in perspective view depicting the various components separate from one another.

The present invention includes a flying foam assembly 5 having solution tank 10 that has an open end 25. Open end 25 receives logo board 60 that is removably attached to tank 10 with mounting ring 20. Tank 10 has a circumferal vertical side 18 that is substantially perpendicular to tank base 15. Logo board 60 is removed by detaching mounting ring 20 in order to add foam solution into tank 10.

Mounting ring 20 further incorporates cutting arm assembly 75 that is circumferally attached to mounting ring 20. Cutting arm assembly 75 has cutting arm 40 that moves about pivot 50. Pivot 50 is connected to motor 30 which further is incorporated with timer 80. Motor 30 electronically moves cutting arm 40 across the upper planar surface of logo board 60. Further incorporated onto cutting arm assembly 75 is a pair of bump stop protrusions 110 that limit the motion of cutting arm 40. Limit switch 100 is electronically connected to motor 30. When cutting arm 40 contacts limit switch 100, motor 30 reverses direction and subsequently reverses direction of cutting arm 40. The change in motor direction imparts reciprocal motion on pivot 50 and subsequently cutting arm 40.

Logo board 60 includes opening 65 that is configured as desired to produce an extruded foam shape 90.

Tank 10 also includes inlet 120 configured to receive gas line 160. Aeration assembly 70 is attached to the interior of tank 10 on base 15. Aeration assembly 70 includes aeration inlet 72 suitably configured to receive gas line 160. Aeration assembly 70 additionally includes aeration head 71 for dispersing gas throughout solution contained in tank 10.

Figure 3:
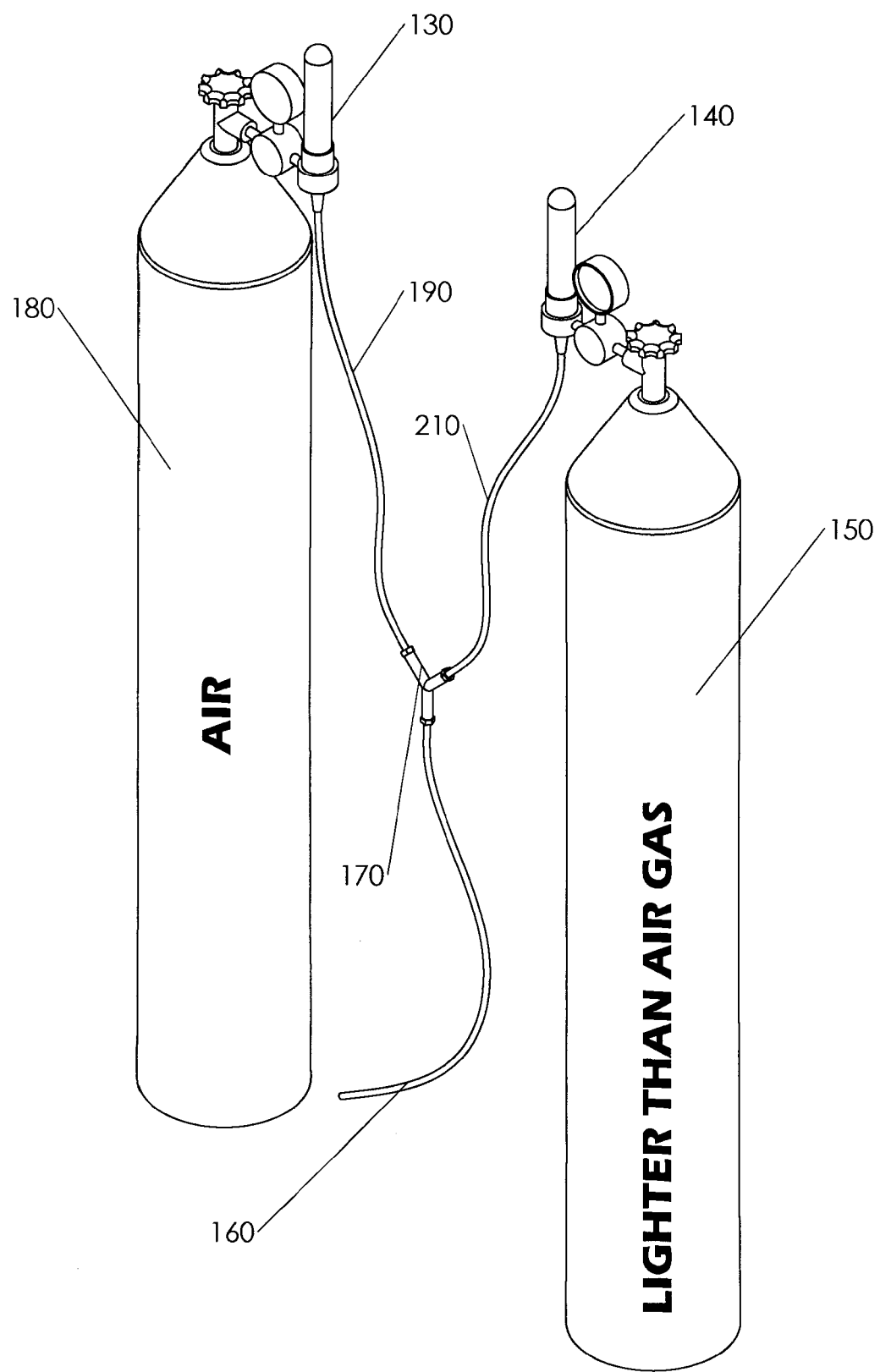
FIG. 3 is a view of two compressed gas cylinders with respective outlet lines connected by a "Y" connector to form a single gas line.

In the embodiment depicted in FIG. 3, the present invention may incorporate a mixture of two or more cylinders of compressed gas. An atmospheric air gas cylinder 180 with a gas line outlet 190 may be combined with a lighter than air gas cylinder 150 with a gas line outlet 210. Gas line outlets 190 and 210 are combined with gas line "Y" connector 170 directing the combined gas into a single gas line 160. Gas cylinder 180 has outlet pressure regulator 130. Gas cylinder 150 has outlet pressure regulator 140. Each of regulators 130 and 140 can be independently adjusted to provide a desired mixture composition of gas from each of cylinders 180 and 150.

Gas line 160 passes through gas line inlet 120 incorporated into outer wall 18 of tank 10. Gas line 160 attached to gas line fitting inlet 72 on aeration assembly 70. Preferably, gas line fitting inlet 72 is tapered, as is known, and gas line 160 is attached and held in place by tension exerted on the inner walls of gas line 160. Aeration assembly 70 has an aeration nozzle 71 for dispersing the received gas into the solution contained on the interior region 19 within tank 10.

Figure 4:
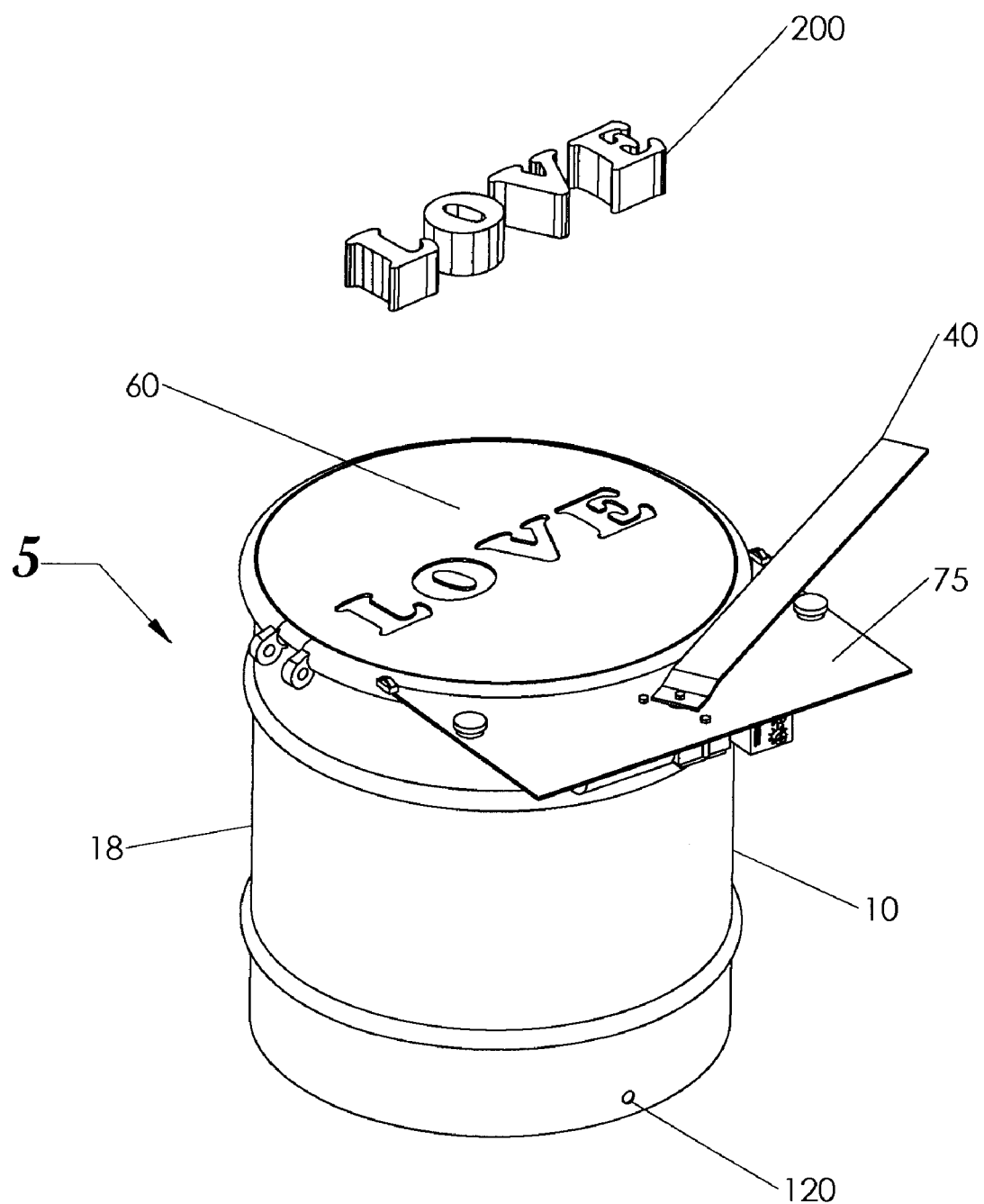
FIG. 4 is a perspective showing an extruded floating shape after being separated.
Figure 5:
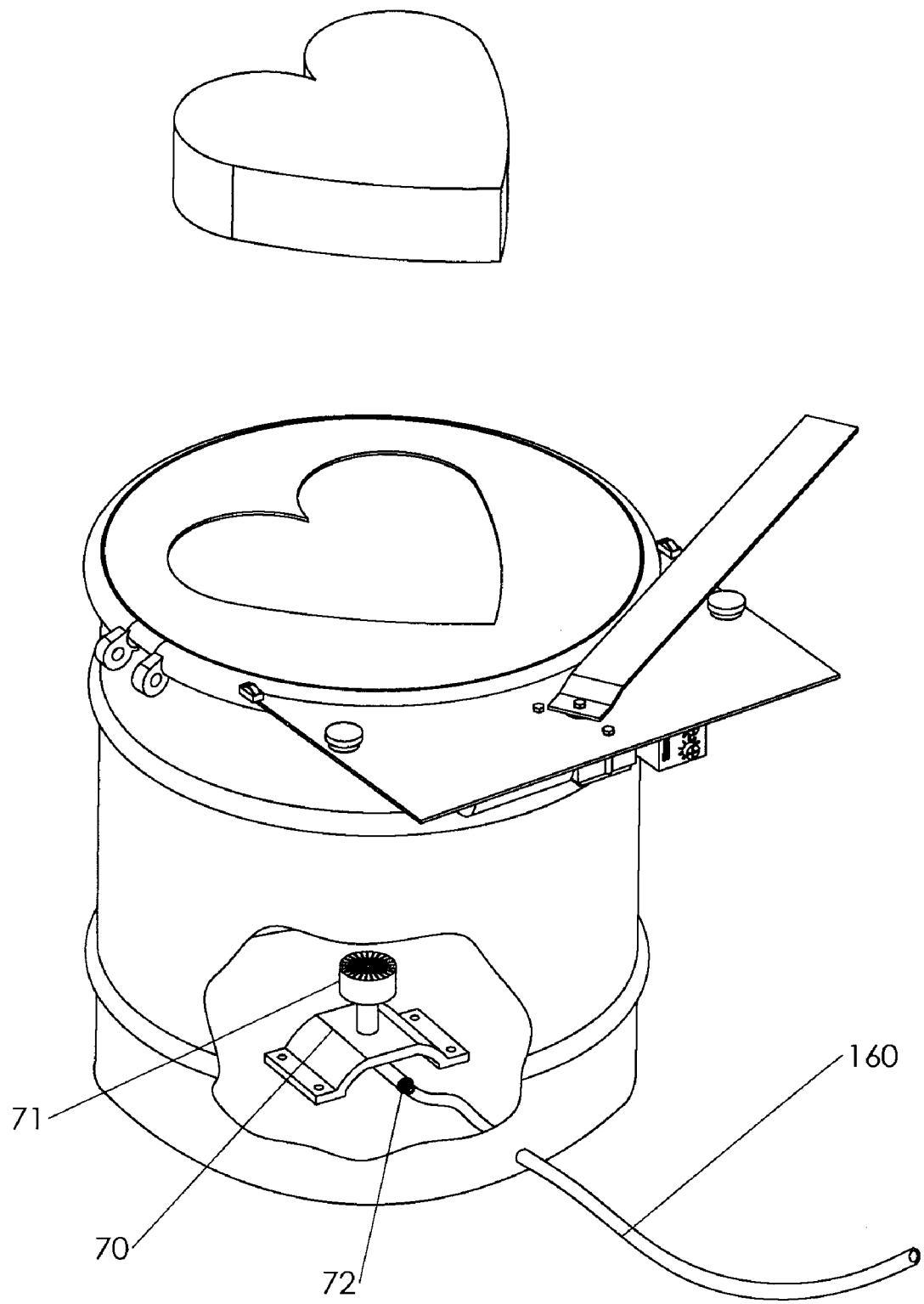
FIG. 5 is a perspective view with a partial cut away depicting placement of an aeration assembly on the bottom interior surface of the solution tank.
Figure 6:
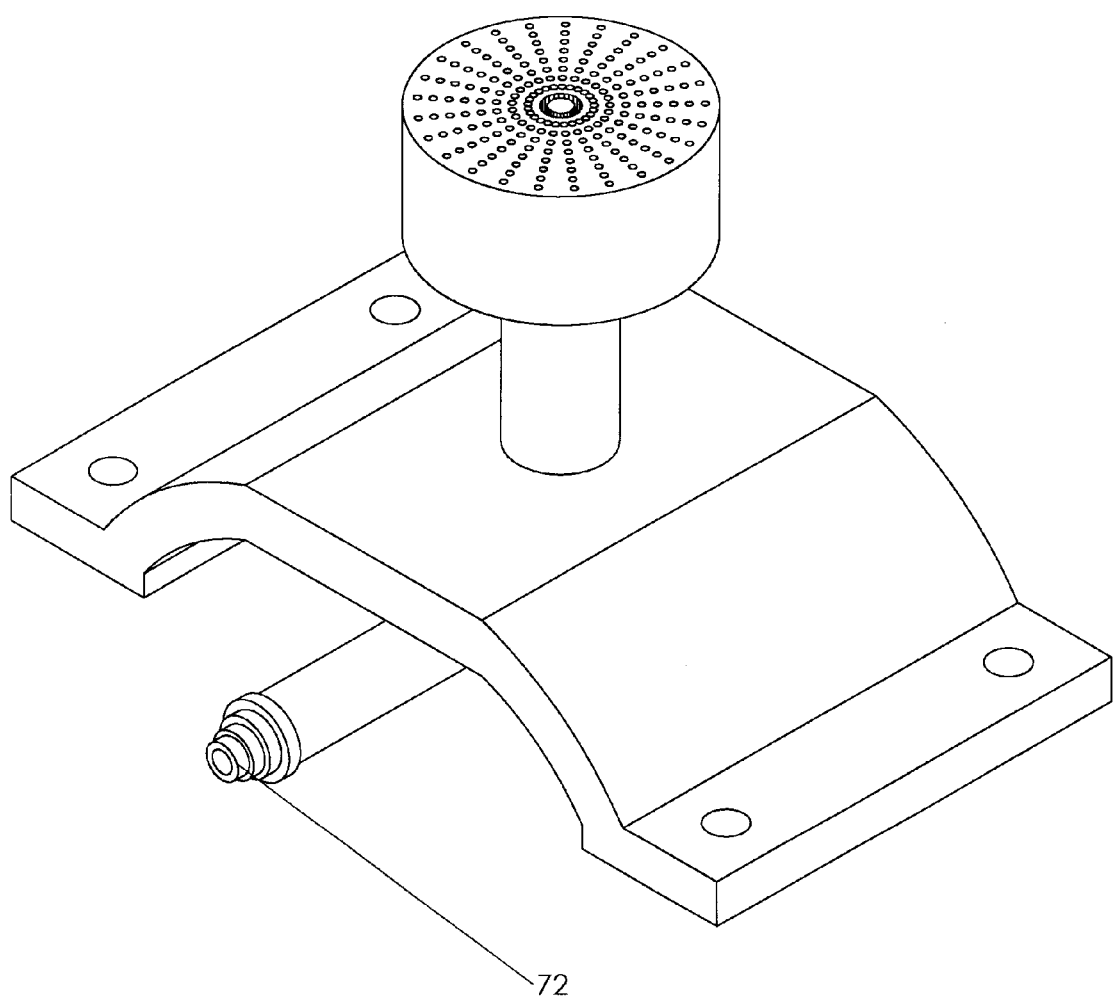
FIG. 6 is side perspective view of the aeration nozzle assembly.

In the embodiment depicted in FIG. 4, foam shape 200 may be a word.

In use, mounting ring 20 is detached from the circumference of the upper portion of tank wall 18 exposing tank opening 25. An appropriate solution, such as those set forth above, for creating foam is placed in interior region 19 of tank 10 through tank opening 25. Mounting ring 20 circumferally surrounds logo board 60. Mounting ring 20 with attached cutting arm assembly 75 is secured over tank opening 25 circumferally around the top portion of tank wall 18.

In use, electric motor 30 reciprocally moves pivot 50 and attached cutting arm 40. Cutting arm 40 reciprocates forward and back along the upper planar surface of logo board 60 and said reciprocation is effectuated by a limit switch 110 placed on the surface of logo board 60. The rate of movement and reciprocation of cutting arm 40 is adjustable by utilization of motor timer mechanism 80.

In use, gas flow is initiated through at least one source of compressed gas. The gas may be a lighter than air gas from a compressed cylinder 150 or may be a combination of lighter than air gas from a compressed cylinder 150 mixed with compressed ambient air from compressed gas cylinder 180. Cylinder 150 has pressure regulator 140 and cylinder 180 has pressure regulator 130.

Figure 7:
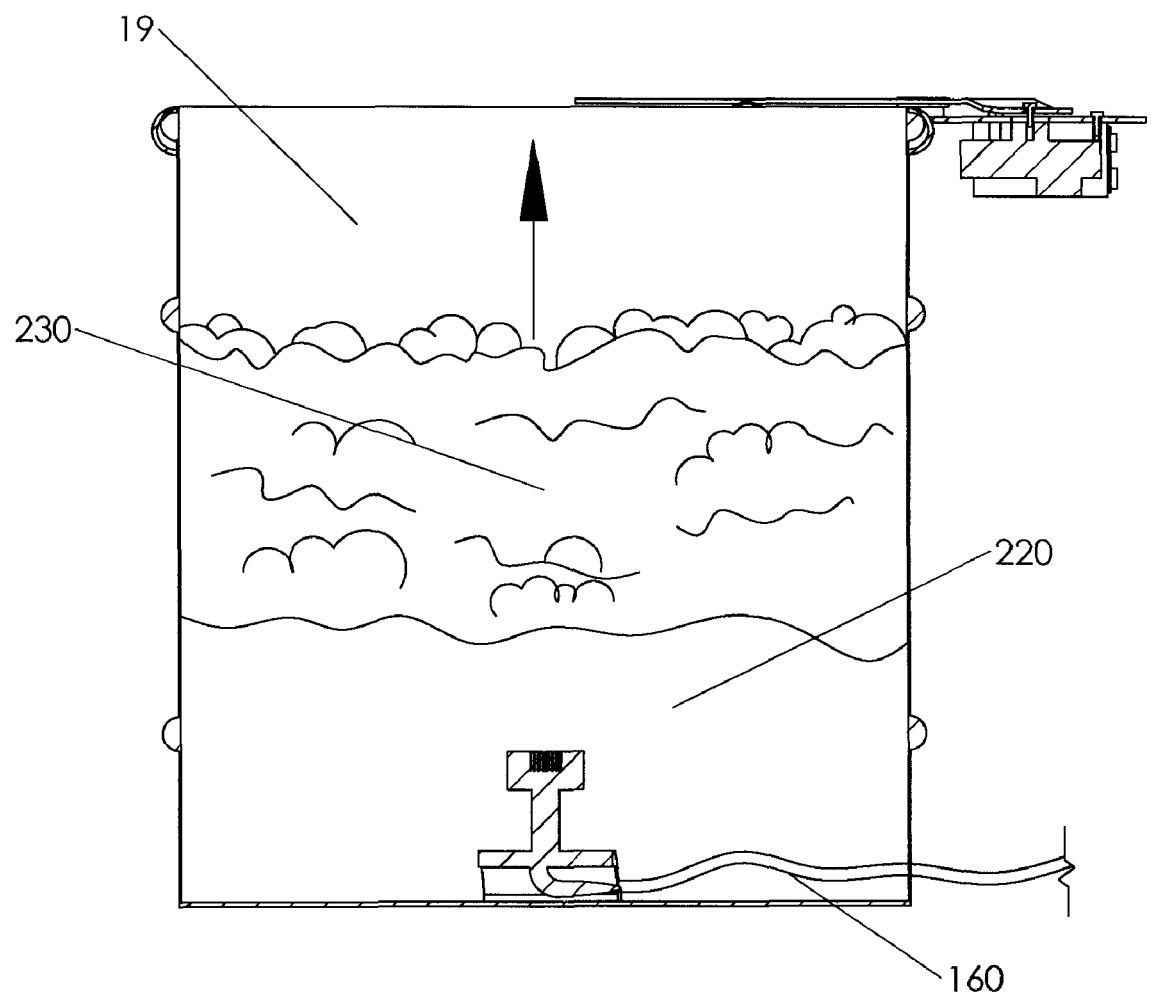
FIG. 7 is a side cross section view showing the foam formation and direction of exit.

Compressed gas travels through gas line 160. Gas line 160 enters tank 10 through inlet 120. Gas line 160 attaches to aeration assembly 70 at gas inlet 72. The gas exits aeration assembly 70 at aeration nozzle 71. The gas disperses through the solution contained on the interior 19 of tank 10. When the gas mixes with foam solution 220, foam 230 is produced along the surface of solution 220. Gas pressure is created by compressed gas entering interior 19 of tank 10. Logo board 60 has opening 65 which forms an exit to the outside of tank 10. The outside of tank 10 is at approximately atmospheric pressure. The gas, and created foam is urged upward by the pressure differential between the inside of tank 10 and the outside atmospheric pressure. Foam 230 travels upward from the surface of foam solution 220 as shown by the arrow in FIG. 7. The foam is pushed against the underside of logo board 60 foam is extruded through opening 65 in logo board 60. Extruded foam above the upper surface of logo board 60 is separated into individual shapes 90 by cutting arm 40. The separated shape 90 then floats upward away from assembly 5.

Figure 8:
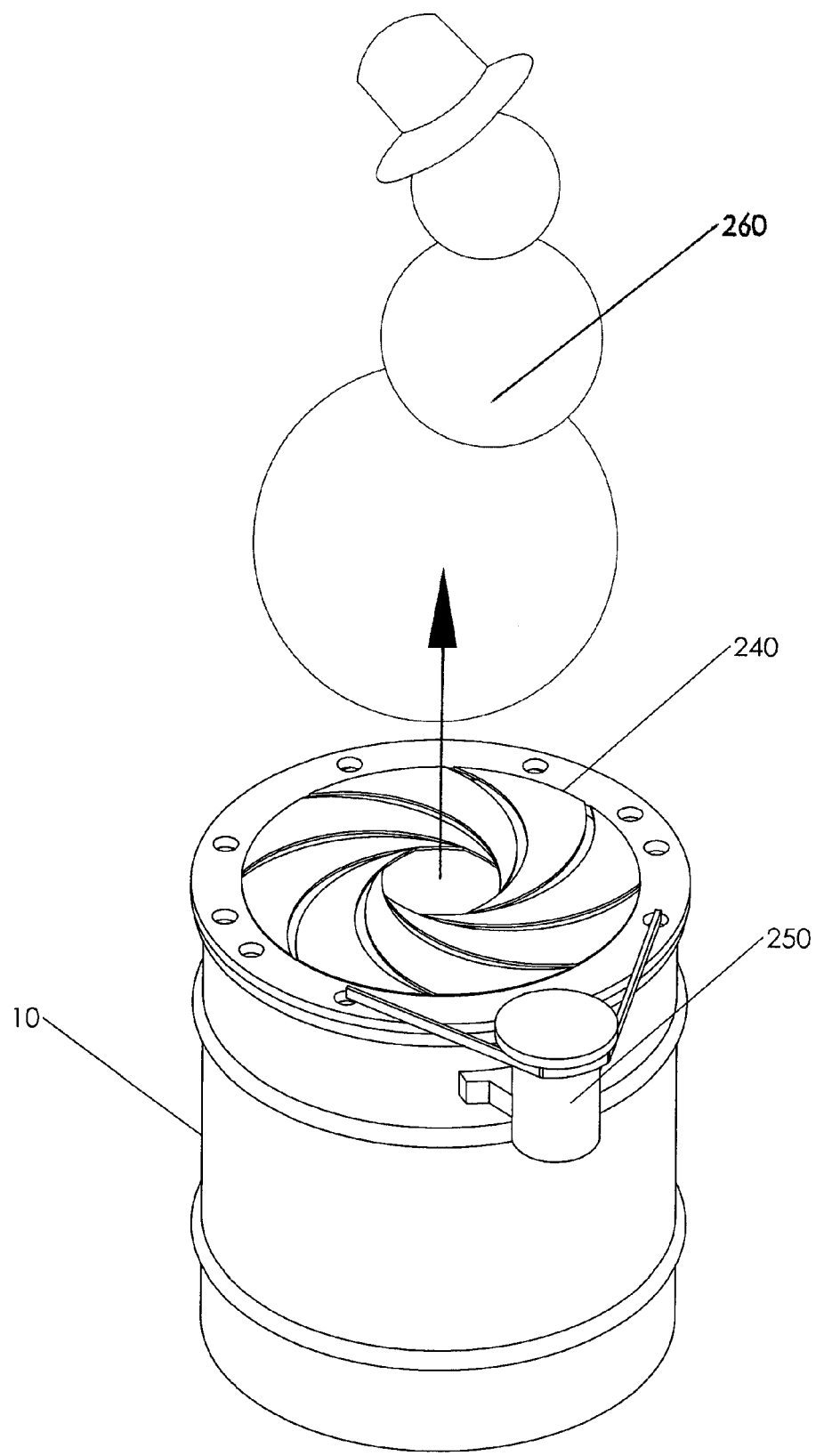
FIG. 8 is a perspective view of the assembly with an iris mechanism.

In another embodiment, as depicted in FIG. 8, tank 10 has an iris 240 that opens and closes with iris motor 250. In using iris 240, the size of an extruded foam may be varied and would depend on the size of the opening and duration the iris is open.

The iris may be configured to close partially or totally. Additionally, if the iris were to close partially, the iris may be used in cooperation with the cutting arm as previously described.

In the embodiment using iris 240, the flying foam may be similar shapes of varying sizes that may be either connected or individualized.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. An apparatus for generating foam shapes that float in air consisting of:
   a. a container;
   b. a gas source, wherein said gas from said gas source is lighter than atmospheric air;
   c. an aeration nozzle for aerating a gas from the gas source;
   d. an outlet;
   e. a separator for separating extruded foam into individualized foam shapes.

2. The apparatus of claim 1 wherein said gas source is an inlet extending from the outside of the container into the interior of said container.

3. The apparatus of claim 1 wherein said outlet is a container cover with a stencil shape opening incorporated therein.

4. The apparatus of claim 1 wherein said container is filled with an aqueous solution comprising at least on surfactant for producing foam when said solution is aerated with a gas.

5. The apparatus of claim 1 wherein said gas has a molecular mass of less than 28.97 g/mole.

6. The apparatus of claim 1 wherein said gas is selected from the group consisting of helium, hydrogen, methane, ethane, ammonia, neon, acetylene, ethylene, carbon monoxide, hydrogen fluoride, diborane, heated atmospheric air, nitrogen, or mixtures thereof.

7. The apparatus of claim 4 wherein said aqueous solution comprises a component sensitive to ultraviolet light.

8. The apparatus of claim 4 wherein said aqueous solution comprises a luminescent compound.

9. The apparatus of claim 8 wherein said luminescent compound is Luminol (5-Amino-2,3-dihydro-1,4-phthalazinedione), Cyalume (Diphenylefhandioate), Ruthenium(II)tris(bipyridine)dichioride, Oxalyl chloride and Pyrogallol.

10. The apparatus of claim 4 wherein said aqueous solution comprises at least one color.

11. The apparatus of claim 1 wherein said gas passes through a regulator valve.

12. The apparatus of claim 11 wherein said regulator valve delivers gas to said aeration device at a pressure of about less than 50 psi.

13. The apparatus of claim 1 wherein said opening is configured to extrude foam into a desired shape.

14. A method of advertising comprising the steps of:
   a. providing an apparatus for generating foam shapes that float in air, said apparatus consisting of:
   a container;
   a gas source;
   an aeration nozzle for aerating a gas from the gas source;
   an outlet;
   a separator for separating extruded foam into individualized foam shapes;
   b. providing said outlet in the shape of a corporate logo;
   c. filling a foam solution container with foam solution;
   d. introducing compressed gas to the interior of said foam solution container, wherein said introduction is through said aeration nozzle;
   e. separating foam extruded through said outlet;
   f. forming at least one flying foam shape, wherein said shape, configured by the outlet in the shape of a corporate logo, is used as a flying corporate advertisement.

15. A method for creating a floating foam shape comprising the steps of:
   a. providing an apparatus for generating foam shapes that float in air, said apparatus consisting of:
   a container;
   a gas source;
   an aeration nozzle for aerating a gas from the gas source;
   an outlet;
   a separator for separating extruded foam into individualized foam shapes;
   b. providing said outlet in a desired shape;
   c. filling a foam solution container with foam solution;
   d. introducing compressed gas to the interior of said foam solution container, wherein said introduction is through said aeration nozzle;
   e. separating foam extruded through said outlet;
   f. forming at least one flying foam shape from said separating, wherein said shape is substantially similar to the shape of said outlet.

16. The method of claim 15 wherein said outlet is a container cover with a stencil shape opening incorporated therein.

17. The method of claim 15 wherein said container is filled with an aqueous solution comprising at least one surfactant for producing foam when said solution is aerated with a gas.

18. The method of claim 15 wherein said gas is lighter than atmospheric air.

19. The method of claim 15 wherein wherein said gas has a molecular mass of less than 28.97 g/mole.

20. The method of claim 15 wherein said gas is selected from the group consisting of helium, hydrogen, methane, ethane, ammonia, neon, acetylene, ethylene, carbon monoxide, hydrogen fluoride, diborane, heated atmospheric air, nitrogen, or mixtures thereof.

21. The method of claim 15 wherein said aqueous solution comprises a component sensitive to ultraviolet light.

22. The method of claim 15 wherein said luminescent compound is Luminol (5-Amino-2,3-dihydro-1,4-phthalazinedione), Cyalume (Diphenylefhandioate), Ruthenium(II)tris(bipyridine)dichioride, Oxalyl chloride and Pyrogallol.

23. The method of claim 15 wherein said aqueous solution comprises at least one color.

24. The method of claim 15 wherein said gas passes through a regulator valve.

25. The method of claim 24 wherein said regulator valve delivers gas to said aeration device at a pressure of about less than 50 psi.

* * * * *